(12) United States Patent
Cruz García

(10) Patent No.: US 10,861,322 B2
(45) Date of Patent: Dec. 8, 2020

(54) SYSTEM AND DEVICE FOR MONITORING PARAMETERS

(71) Applicant: Roberto Luis Sutcliffe Guido, Mexico City (MX)

(72) Inventor: Gerardo Alberto Cruz García, Mexico City (MX)

(73) Assignee: Roberto Luis Sutcliffe Guido, Mexico City (MX)

(*) Notice: Subject to any disclaimer, the term of this patent is extended or adjusted under 35 U.S.C. 154(b) by 0 days.

(21) Appl. No.: 16/301,938

(22) PCT Filed: Dec. 14, 2017

(86) PCT No.: PCT/MX2017/000149
§ 371 (c)(1),
(2) Date: Nov. 15, 2018

(87) PCT Pub. No.: WO2018/117808
PCT Pub. Date: Jun. 28, 2018

(65) Prior Publication Data
US 2020/0320858 A1    Oct. 8, 2020

(30) Foreign Application Priority Data

Dec. 19, 2016 (MX) .................. MX/A/2016/016996

(51) Int. Cl.
| | | |
|---|---|---|
| G08C 17/02 | (2006.01) | |
| H04L 29/08 | (2006.01) | |
| G01D 3/08 | (2006.01) | |
| H01Q 1/22 | (2006.01) | |
| G08B 21/18 | (2006.01) | |

(52) U.S. Cl.
CPC ............. *G08C 17/02* (2013.01); *G01D 3/08* (2013.01); *G08B 21/18* (2013.01); *H01Q 1/2291* (2013.01); *H04L 67/12* (2013.01)

(58) Field of Classification Search
CPC .......... G08C 17/02; G01D 3/08; G08B 21/18; H01Q 1/2291; H04L 67/12
See application file for complete search history.

(56) References Cited

U.S. PATENT DOCUMENTS

| | | | |
|---|---|---|---|
| 2008/0106605 A1 | 5/2008 | Schrijen et al. | |
| 2011/0253786 A1 | 10/2011 | Campbell et al. | |
| 2016/0242050 A1* | 8/2016 | Salajegheh | H04W 16/22 |

FOREIGN PATENT DOCUMENTS

JP    2002299842    10/2002

* cited by examiner

*Primary Examiner* — Curtis B Odom
(74) *Attorney, Agent, or Firm* — Duane Morris LLP; Gregory M. Lefkowitz

(57) ABSTRACT

A system and device for monitoring parameters that are used in metrology to monitor one or more physical parameters remotely in real time are disclosed. By utilizing the system and device, a user can monitor a machine, a process or a phenomenon, by means of messages, emails and/or an application on his mobile phone or computer connected to the internet.

49 Claims, 15 Drawing Sheets

SYSTEM AND DEVICE FOR MONITORING PARAMETERS

CROSS-REFERENCE TO RELATED APPLICATIONS

This application is a § 371 national stage entry of International Application No. PCT/MX2017/000149, filed on Dec. 14, 2017, which claims priority to Mexican Application No. MX/a/2016/016996, filed Dec. 19, 2016, the entire contents of which are incorporated herein by reference.

FIELD OF THE INVENTION

The present invention is related to measurement and telecommunication systems and devices, particularly it refers to a system and device for monitoring parameters, which is used in metrology to monitor one or more physical parameters remotely, wirelessly and in real time.

BACKGROUND OF THE INVENTION

Nowadays there are different types of equipment or devices available in the market which allow the measurement of several parameters, such as temperature, pressure, level, humidity, brightness, movement, rotation, location, current, among others. Many of these equipments require personal supervision, since they require the presence of a technician or some other person which most be at the measurement place in order to read and keep a log of the target parameter. However, in some cases this personal supervision measurement becomes difficult or inconvenient, either because the machine or device to be monitored is far located or in a high place, or because it is located in a difficult place to reach such as a roof, a machine room, or in a small space. Therefore it is necessary to have a system and/or device which provide remote measurements and thus be able to monitor the target machine, device, process or phenomenon from another location, and preferably in a wireless way.

A very desirable feature in measuring or remote monitoring equipment is the option of detecting an abrupt variation in the measured parameter. Since some measuring equipment, are meant to remain without supervision for long periods of time, and sometimes these equipment contain substances that can be stolen by someone who knows there is no control and monitoring of it. For example, the LP gas contained in stationary tanks can be easily stolen if the tank is not constantly monitored.

This situation also makes vulnerable the measuring equipment, since the person who wants to steal the LP gas inside the tank may also try to manipulate or disable the measuring device so that the robbery is not detected.

On the other hand, it is well known that during the filling of said gas tanks, the suppliers use diverse procedures to simulate the correct filling of said tank, however in many occasions the client does not receive the quantity of liters the supplier reported as dispatched. Therefore it is necessary to have a reliable device that allows the easy corroboration of this information, in order to make the corresponding clarification.

In order to analyze the monitored parameters, or to keep them as a backup, it is very important to have a register or logbook, however many devices available on the market only allow the technician or user to perform the measurement, but later they have to manually register the information either in a computer or on paper. Therefore, it is also very desirable an automatic registration and an automatic memory storing function in order to further use of the data, for example in an electronic spreadsheet allowing to control the monitoring of a machine.

A very important aspect in this type of equipment is its versatility, since the industry requires monitoring several parameters, so it is desirable to have some equipment which allows measurements depending on the connected sensor. This means that it would be very advantageous to have a system and/or device that allows the pressure measurement when a pressure sensor is connected to it, or humidity measurement when a humidity sensor is connected to it, etc. In this way there would be a single system and/or device that can be used in several applications, making it a multi-use system or device.

In order to eliminate these and other drawbacks, the system and device for monitoring parameters of the present invention was developed. It allows permanent remote monitoring of various physical parameters, detecting manipulations in said device and abrupt changes in the measurement during a failure or robbery, among other functions. In addition it can remotely monitor wirelessly on real time one or more physical parameters.

SUMMARY OF THE INVENTION

It is therefore an objective of the present invention to provide a system and device for monitoring parameters, which allow remote monitoring in real time.

Another objective of the present invention is to provide a system and device for monitoring parameters, which detect manipulations in said device by emitting an alert.

Another objective of the present invention is to provide a system and device for monitoring parameters, which detect abrupt changes in the measurement of at least one target parameter by emitting an alert.

Another object of the present invention is to provide a system and device for monitoring parameters, which can communicate with the user by a mobile application, a web site, and/or a computer.

Another objective of the present invention is to provide a system and device for monitoring parameters, which monitor a machine, device, process or phenomenon, permanently and automatically by storing all the monitored information in a memory and displaying it in an electronic spreadsheet.

Another objective of the present invention is to provide a system and device for monitoring parameters, which measure one or several parameters depending on the number of sensors connected to it.

Another objective of the present invention is to provide a system and device for monitoring parameters, which provide reference information to detect supply scam.

Another objective of the present invention is to provide a system and device for monitoring parameters, modular and configurable to be adapted to the user needs.

Another objective of the present invention is to provide a system and device for monitoring parameters, which allow making high-resolution measurements.

Another objective of the present invention is to provide a system and device for monitoring parameters, which allow simultaneous measurements from different sensors.

A further objective of the present invention is to provide a system and device for monitoring parameters, which can be used in a network of devices communicated to each other, to obtain the information through a centralized system in a server of the internet network.

BRIEF DESCRIPTION OF THE FIGURES OF THE INVENTION

DETAILED DESCRIPTION OF THE INVENTION

Figure 1:
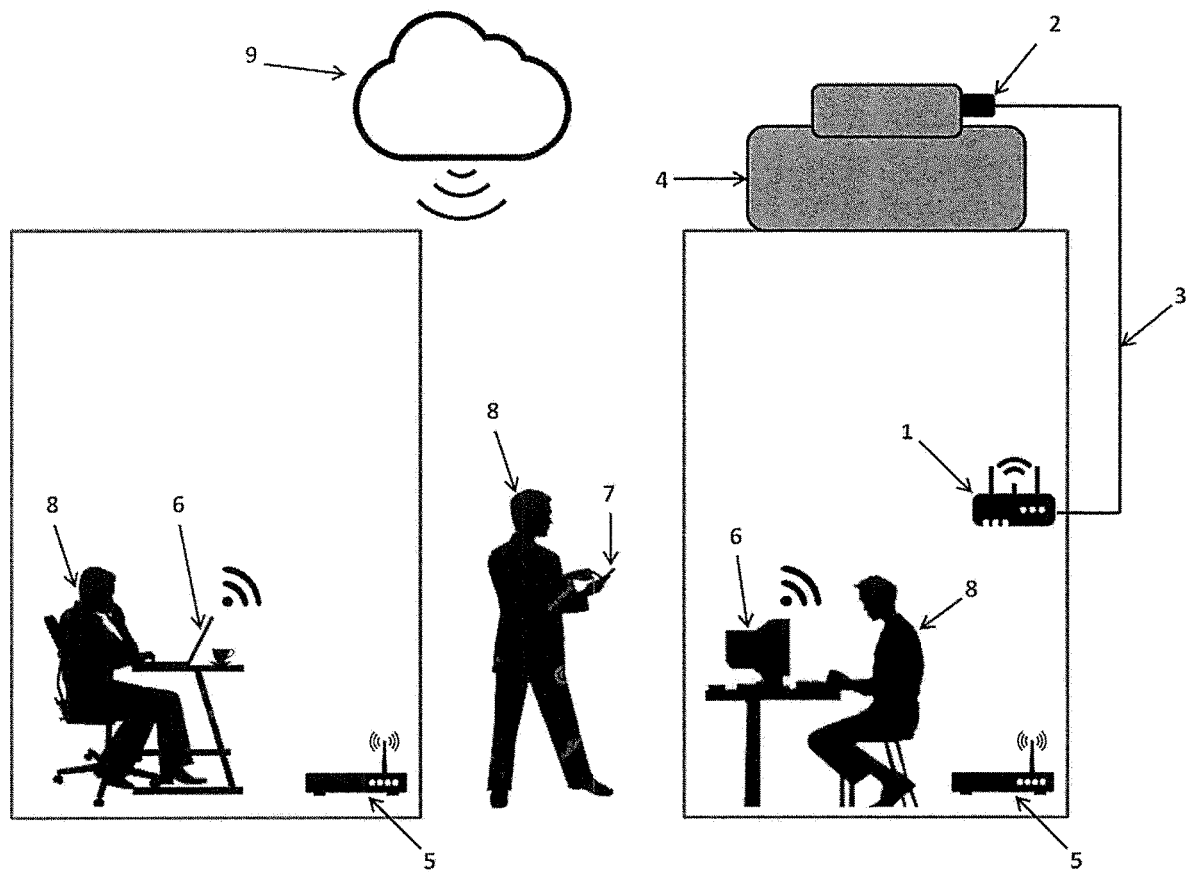
FIG. 1 shows an operation diagram of one embodiment of the system and device for monitoring parameters, which shows the communication board (1), acquisition board(s) (2), the connection cable (3), the stationary tank (4), the modem(s) or router(s) (5), the computers (6), the smartphone (7), the users (8) and the cloud (9).
Figure 2:
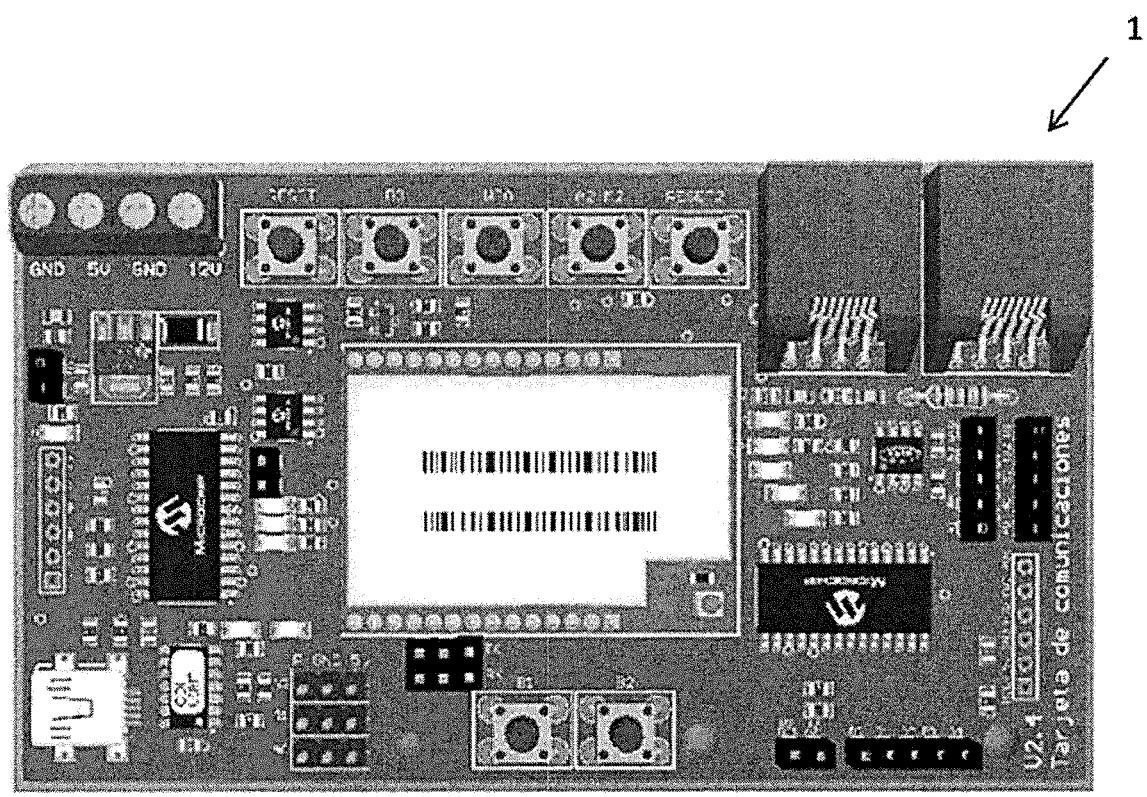
FIG. 2 shows the front view of the communication board (1) of the system and device for monitoring parameters.
Figure 3:
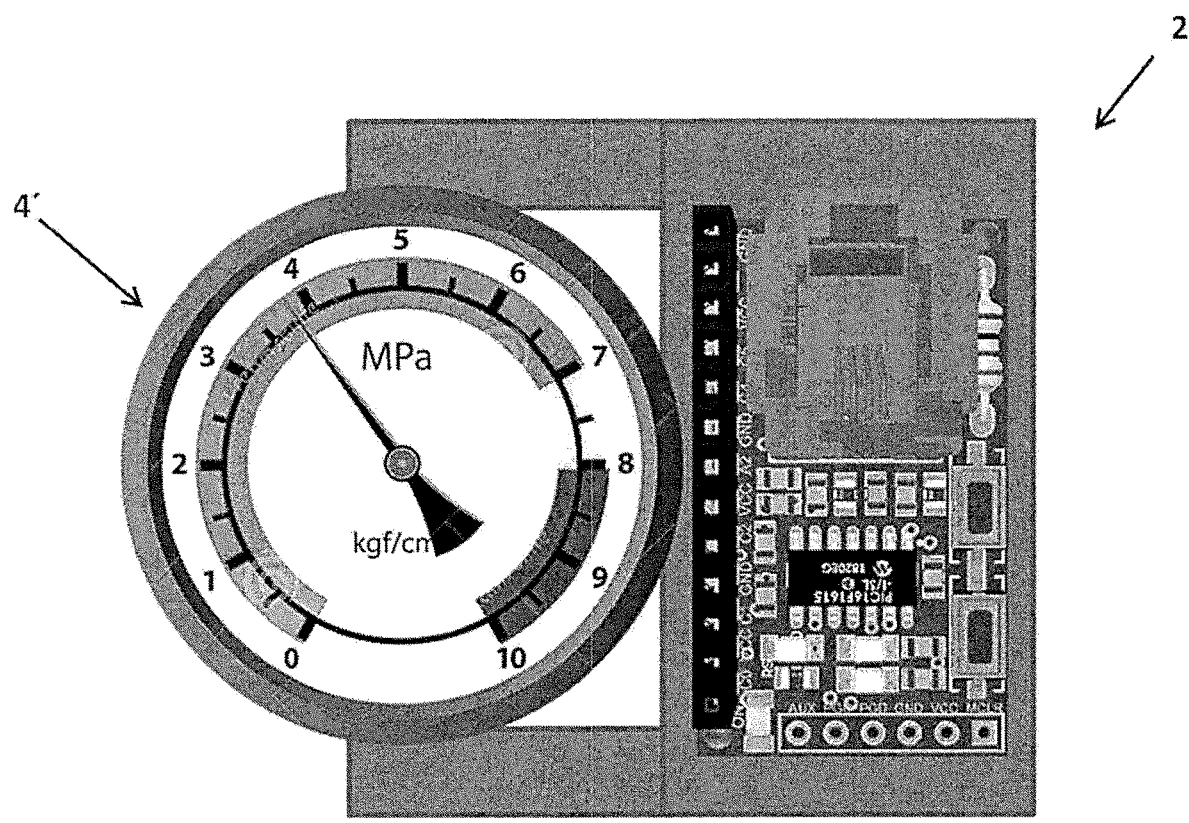
FIG. 3 shows a front view the specific acquisition board (2'), which is mechanically connected to the axis of the manometer (4') of the stationary tank (4) by means of a rotary sensor, in order to measure a physical parameter in one embodiment of the invention.

The present invention relates to a system and device for monitoring parameters, which is used in metrology to monitor one or more physical parameters remotely in real time.

The device for monitoring parameters comprising a communication board (1), which comprises a Wi-Fi module (101), a GPS and communication module RS-485 (102), a USB input (103), communication connectors (104), a transceiver (105), processing module (106), at least one storage unit (107), and a voltage regulator (108);

characterized in that it is connected with at least one acquisition board (2);

wherein said at least one acquisition board (2) is an specific acquisition board (2'), which comprises an analog input (201), a data acquisition processing module (202), a transceiver (203) and a communications connector (204); and/or a basic acquisition board (2") which comprises four analog inputs (201), and a 16-bit digital analog converter of 4 channels (205); a data acquisition processing module (202), a transceiver (203) and communication connectors (204); and/or an industrial acquisition board (2'") which comprises four current inputs of 4-20 mA (206), a 4-20 mA to Voltage converter (207), a four channel digital analog converter of 16 bits (208), a data acquisition processing module (202), a transceiver (203) and communication connectors (204);

wherein said at least one acquisition board (2) is characterized by including a manipulation detection device (209), which comprises two metal surfaces in contact through which flows a current that is permanently monitored by a microcontroller of a data acquisition processing module (202) of the at least one acquisition board (2).

The device for monitoring parameters consists of two main elements, the communication board (1) and acquisition board (s) (2), which are connected to each other by means of the connection cable (3), which is a copper cable with CAT5/CAT5e Ethernet connector. This cable is connected to the communication connectors (104 and 204).

The components of the communication board (1) allow to store and process the information coming from the acquisition board (s) (2), communicate with the user (8) and provide electrical power to the acquisition board(s) (2) for its operation. While the components of said acquisition board (2) allow it to detect a physical magnitude by means of the sensor(s), conditioning the signal coming from the sensor to be processed, encoding the signal to be sent to the communication board (1) and detecting manipulations by means of the manipulation detection device (209).

In the preferred embodiment of the invention, the acquisition board(s) (2) is installed at the place where the measurement is to be taken, and preferably, it is fixed by means of screws to the machine(s) or deposit(s) to be monitored.

In the preferred embodiment of the present invention, the acquisition board (2) is fixed by means of screws to the manometer of the stationary tank (4), since the acquisition board (2) has a plastic housing for its fixing. At the same time, the acquisition board (2) is mechanically connected to the axis of the manometer (4') of the stationary tank (4) by means of a rotary sensor in the preferred embodiment of the intention, since this type of sensor can detect the rotation of the axis of the manometer (4').

The acquisition board (2) is also able to operate with a wide variety of sensors, such as pressure sensors, humidity, magnetic, temperature, among others; depending on the physical magnitude to measure, or depending on the indirect measurement to perform, as well as the sensor communication means.

The capacity to work with different types of sensors of the acquisition board (2), is because it has 3 pins of the JST/HEADER type in each inputs (201 or 206), which are compatible with a wide variety of sensors of the analog and digital type, at the same time that the acquisition board (2) can be reprogrammed by a technician in order to adapt to the values and parameters coming from the plugged sensor, since there is a microcontroller and memory in the data acquisition processing module (202) to perform said reprogramming. In this way the system and device for monitoring parameters is able to measure various parameters depending on the sensor that is connected to it.

The acquisition board (2) is the element responsible for communicating the values from the sensor to the communication board (1) via the connection cable (3), by means of an RS-485 protocol to the communication board (1).

The use of the RS-485 protocol allows the connection cable (3) to have a maximum length of up to 300 meters, which is a very convenient length to provide adaptability to the system and device for monitoring parameters installation.

The manipulation detection device (209) is the element of the acquisition board (2), which detects when the acquisition board (2) is physically opened.

Said manipulation detection device (209), is formed by two metal surfaces in contact, through which a current flows that is permanently monitored by a microcontroller of the data acquisition processing module (202), in the same way as an input (201 or 206), so that when said metal surfaces are separated, an interruption of the current occurs, which is interpreted by the microcontroller of the data acquisition processing module (202) as a manipulation or opening of the acquisition board (2), thus generating a manipulation alert, which is sent to the communication board (1), by means of the connection cable (3).

The communication board (1) is preferably installed inside of a building or protected from the environment, unlike the acquisition board(s) (2), which can be installed outdoors since it has a plastic casing (can be metallic) that protects it from environment conditions.

Once the communication board (1) receives the information coming from the acquisition board(s) (2) through the connection cable (3), said information is processed by a microprocessor of the processing module (106), and stored by the storage unit (107), wherein the processing module (106) is comprised of at least one microcontroller, and the storage unit (107) by at least one EEPROM memory.

The processing module (106) of the acquisition board(s) (2), uses the registered configuration in a cloud (9) to store the information in the storage unit (107), and thus be able to analyze the information coming from the acquisition board(s) (2), and also be able to carry out various actions such as connect to the internet through the communication board (1);

monitor in real time the physical parameters of the sensors connected to the acquisition board(s) (2); and control the calibration of said sensors.

The information analysis carried out by the processing module (106) is made during the constant and automatic monitoring of the values obtained by the acquisition board(s) (2), since said values are introduced in an algorithm to detect abrupt fluctuations, which generates a fluctuation alert.

It should be noted that said algorithm, as well as any other configuration relating to software (eg processes), is programmed by a technician through the USB input (103) or through the configuration registered in the cloud (9).

Similarly, the software, contained in the storage unit (107), in conjunction with the processing module (106), allows receiving the manipulation alert, coming from the sensor of the acquisition board(s) (2).

The internet connection of the communication board (1), is provided by its a Wi-Fi module (101), by means of which the communication board (1) is connected by a modem (5) to a remote server or cloud (9), which stores all the information that the acquisition board (2) sends to the communication board (1), in such a way that the user (8) can obtain said information through a computer (6) or any other device with an internet connection, such as a smartphone (7).

By allowing the communication board (1) to be connected by means of a modem (5) to a remote server or cloud (9), it is possible for the user (8) to download the information that the acquisition board (2) sends to the communication board (1), in an electronic spreadsheet by means of a specialized software for this purpose. This makes the permanent and automatic registration or control of a machine or physical parameter, storing all the information in the memory of the cloud server (9).

The voltage regulator (108) of the communication board (1) works as a connector for a power supply, with the purpose of providing electrical power for the operation of the communication board (1) and the acquisition board (2). However, the communication board (1) and the acquisition board(s) (2) can also have an optional backup battery.

Regarding the materials, the plastic elements can be replaced by metal elements or some other material, such is the case of the plastic housing, as long as they have the proper characteristics for the previously explained operation.

In this way, the system and device for monitoring parameters allows remote monitoring, because the magnitude measured by the sensor of the acquisition board (2) is transmitted to the communication board (1), which makes said measurement available to the user (8) in turn by means of a smart phone (7) or a computer (6) with an internet connection, allowing said user (8) to be in a different location from the place where the measurement is made.

Regarding the manipulation alert, the user (8) can receive said alert when there is a power interruption between the metal surfaces of the manipulation detection device (209), since the alert generated in the acquisition board(s) (2), is transmitted to the communication board (1), which in turn transmits it to the user (8) by means of a smartphone (7) or a computer (6) with internet access.

Similarly, regarding the fluctuation alert, the user (8) can receive said alert when the algorithm of the communication board (1) detects an abrupt change in the sensor measurements of the acquisition board(s) (2), generating an alert on the communication board (1), which in turn transmits it to the user (8) by means of a smartphone (7) or a computer (6) with internet access.

The communication of the present invention with the user (8), can be done through the internet, which is possible by the connection between the Wi-Fi module (101) of the communication board (1), the modem (5), the cloud (9), and finally the computer (6) or the smartphone (7) with the user's internet connection (8). Wherein all the above mentioned connections have bidirectional communication among its elements.

The system and device for monitoring parameters provides the necessary reference information to detect fraud in the supply, since the record that can be downloaded from the cloud (9) or the query that can be done through the computer (6) or the smartphone (7), all can be compared with the provider supply report.

The resolution of the specific acquisition board (2') is 10 bits, which allows connecting an analog input (201), in the preferred embodiment of the invention.

The resolution of the basic acquisition board (2") is 16 bits, which allows to connect four analog inputs (201), in the preferred embodiment of the invention.

The resolution of the industrial acquisition board (2''') is 16 bits, which allows to connect four inputs 4-20 mA (206), in the preferred embodiment of the invention.

It must be understood that each of the inputs (201 and 206) is intended for the connection of a sensor.

Figure 4:
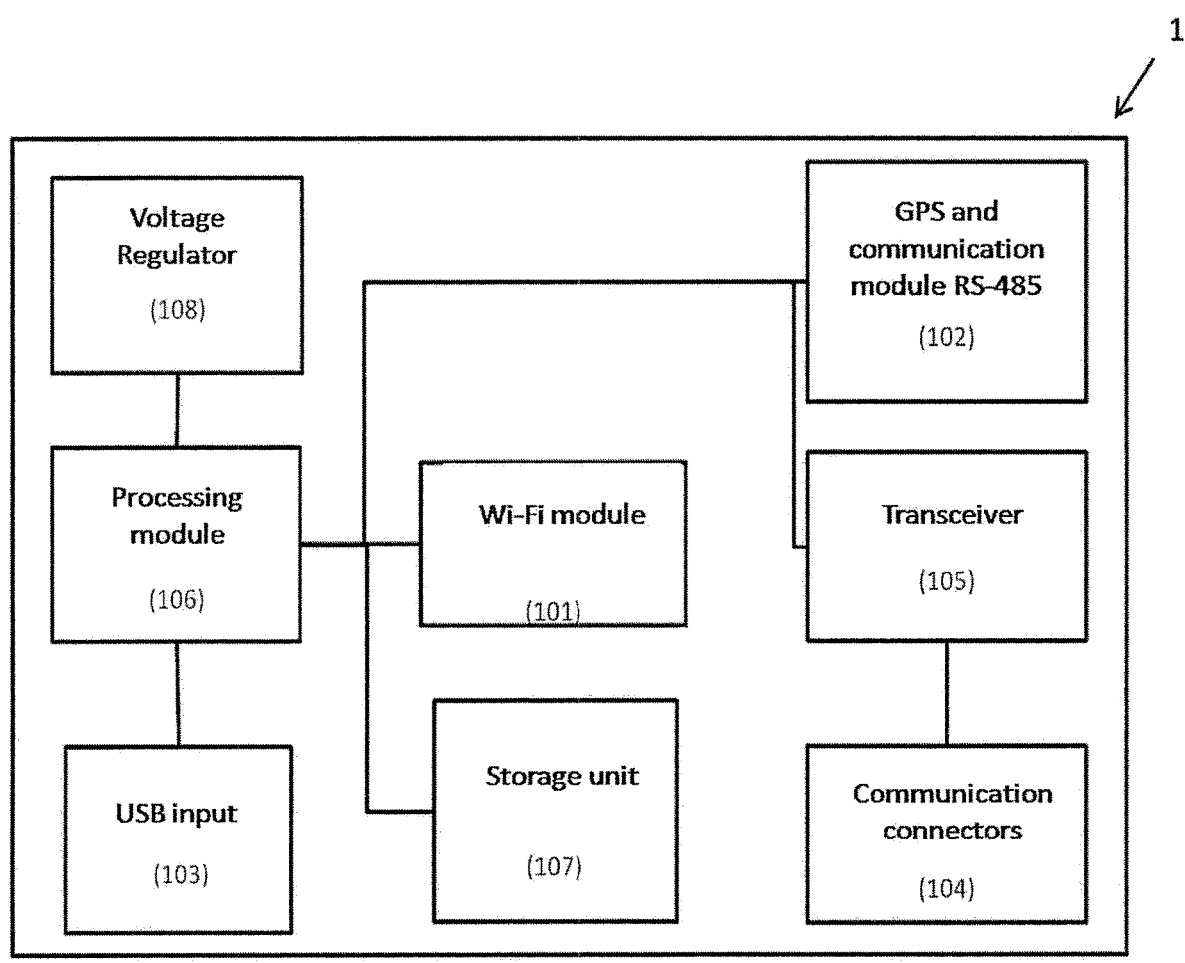
FIG. 4 shows a schematic diagram of the communication board (1).

In the preferred embodiment of the invention, the communication board (1), illustrated in FIG. 4, is formed by a voltage regulator (108) for the operation of the processing module (106), which is an industrial regulator with an input range of 24 v to 5.5V and output voltage of 5 v @ 1 A;

a USB input (103), which is an integrated circuit responsible for the conversion of USB communication to UART communication;

a processing module (106), which is an integrated circuit responsible for information processing and decision making of Wi-Fi communication and UART communication, wherein said integrated circuit is in charge of processing the sent information to the internet from all the sensors connected in the same network;

a storage unit (107), consisting of three EEPROM external memories, which are integrated circuits that store relevant information for the correct operation of the system, programs, algorithms and parameters, among others;

a Wi-Fi module (101), which is responsible for carrying out the Wi-Fi communication with the processing module (106) to send the data or information to the internet;

a GPS and RS485 communication module, which is an integrated circuit responsible for information processing and decision making of RS485 communication and communication with the external GPS module;

a transceiver (105) for high speed and low power RS485 protocol, which is an integrated circuit responsible for converting UART communication to RS485 communication, to transmit the necessary information throughout the network;

and communication connectors (104), which are the means to perform the interconnection between the boards (1 and 2) with RJ-45 connectors.

Figure 5:
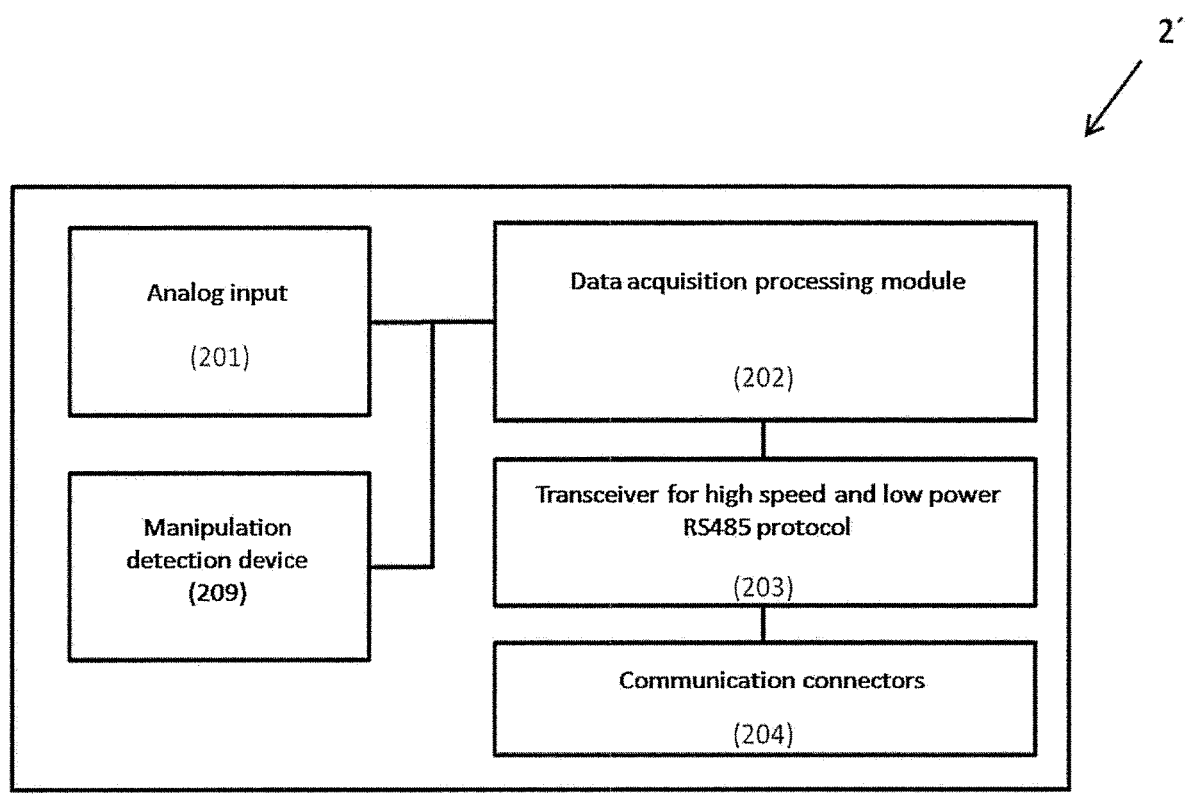
FIG. 5 shows a schematic diagram of the specific acquisition board (2').

Regarding the specific acquisition board (2') illustrated in FIG. 5, of the preferred embodiment of the invention, is formed by a data acquisition processing module (202), which is an integrated circuit responsible for the processing of information received from the analog input (201) to be sent to the transceiver (203) RS485;

a transceiver for high speed and low power RS485 protocol (203), which is an integrated circuit responsible for converting UART communication to RS485 communication, to transmit the necessary information throughout the network; and communication connectors (204), which are means to perform the interconnection between boards (1 and 2) with RJ-45 connectors.

Figure 6:
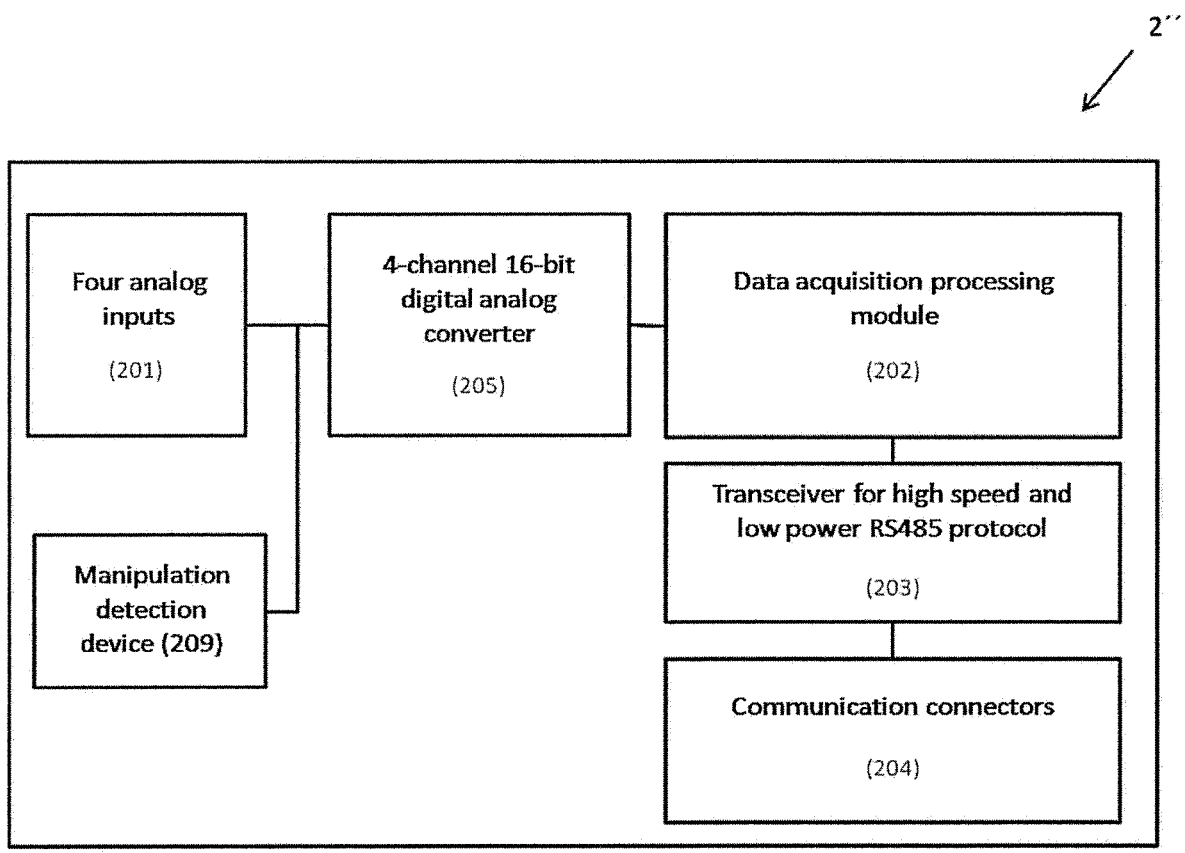
FIG. 6 shows a schematic diagram of the basic acquisition board (2").

Regarding the basic acquisition board (2") illustrated in FIG. 6, of the preferred embodiment of the invention, is formed by a 16-bit digital 4-channel analog converter (205), which is an integrated circuit responsible for the acquisition of data from the analog inputs and 16-bit digital conversion for sending it to the data acquisition processing module (202);

a data acquisition processing module (202), which is an integrated circuit responsible for processing information received from the digital analog converter (205) to be sent to the transceiver (203);

a transceiver (203) for high speed and low power RS485 protocol, which is an integrated circuit responsible for converting UART communication to RS485 communication, to transmit the necessary information throughout the network;

communication connectors (204), which are means to perform the interconnection between boards (1 and 2) with RJ-45 connectors.

Figure 7:
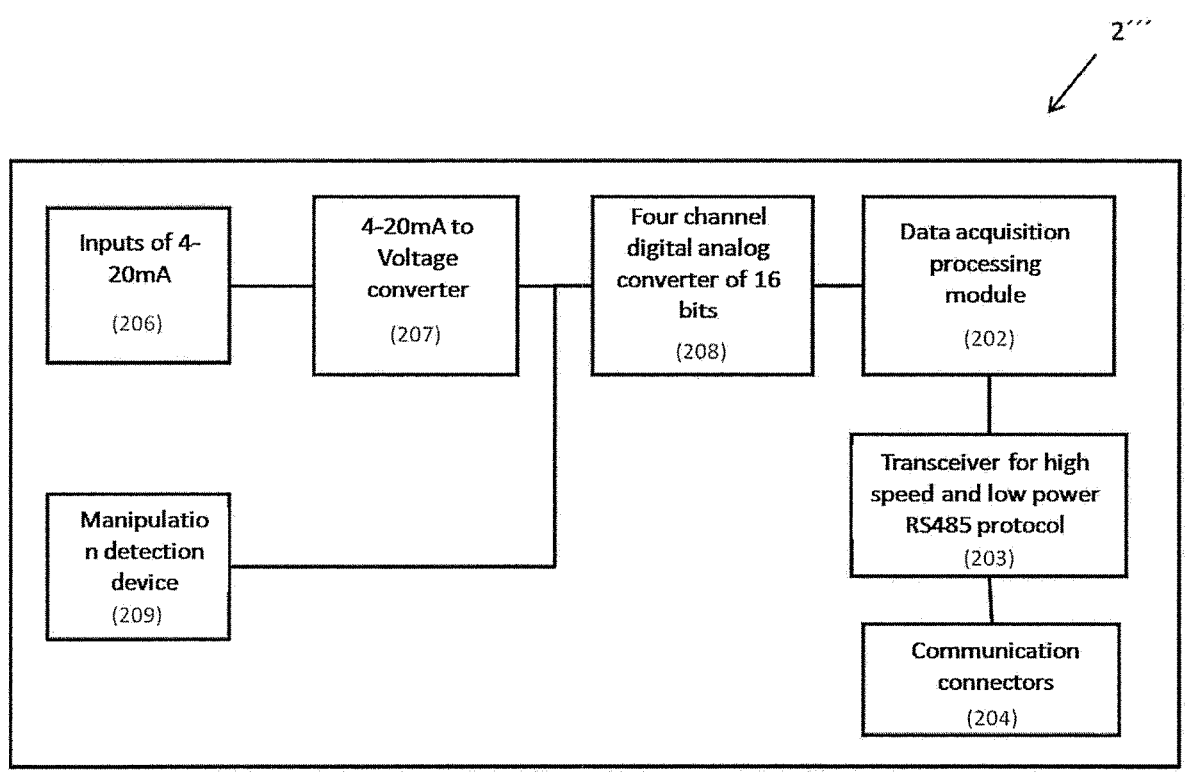
FIG. 7 shows a schematic diagram of the industrial acquisition board (2'").

Regarding the industrial acquisition board (2''') illustrated in FIG. 7 is formed by;

a 4-20 mA to Voltage converter (207), which is an integrated circuit responsible for data acquisition of inputs 4-20 mA (206) and current to voltage conversion to be read by the analogue digital converter of the processing module (208);

a four channels digital analog converter (208) of 16 bits, which is an integrated circuit responsible for the acquisition of data of the 4-20 mA to Voltage converter (207) and digital conversion of 16 bits, to send it to the module of acquisition processing of data (202);

a data acquisition processing module (202), which is an integrated circuit responsible for processing information received from the digital analog converter (208) to be sent to the transceiver (203);

a transceiver (203) for high speed and low power RS485 protocol, which is an integrated circuit responsible for converting UART communication to RS485 communication, to transmit the necessary information throughout the network; and communication connectors (204), which are means to perform the interconnection between boards (1 and 2) with RJ-45 connectors.

Figure 8:
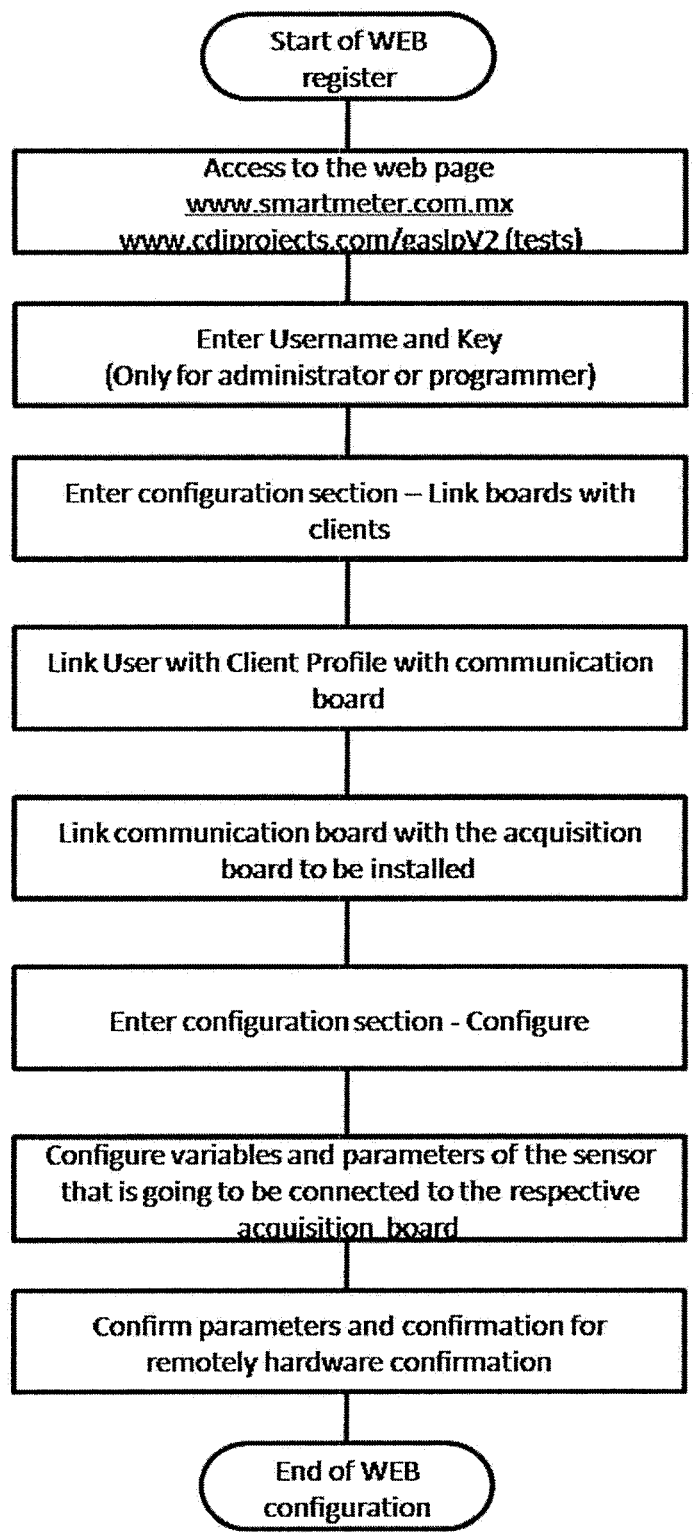
FIG. 8 shows a flow chart of the Registration process on the Website.

The system for monitoring parameters of the present invention requires a registration in the website of the system, which will allow the user (8) to consult the stored information in the cloud (9), by means of a computer (6) and/or a smartphone (7). The registration process on the website is illustrated in FIG. 8.

Figure 9:
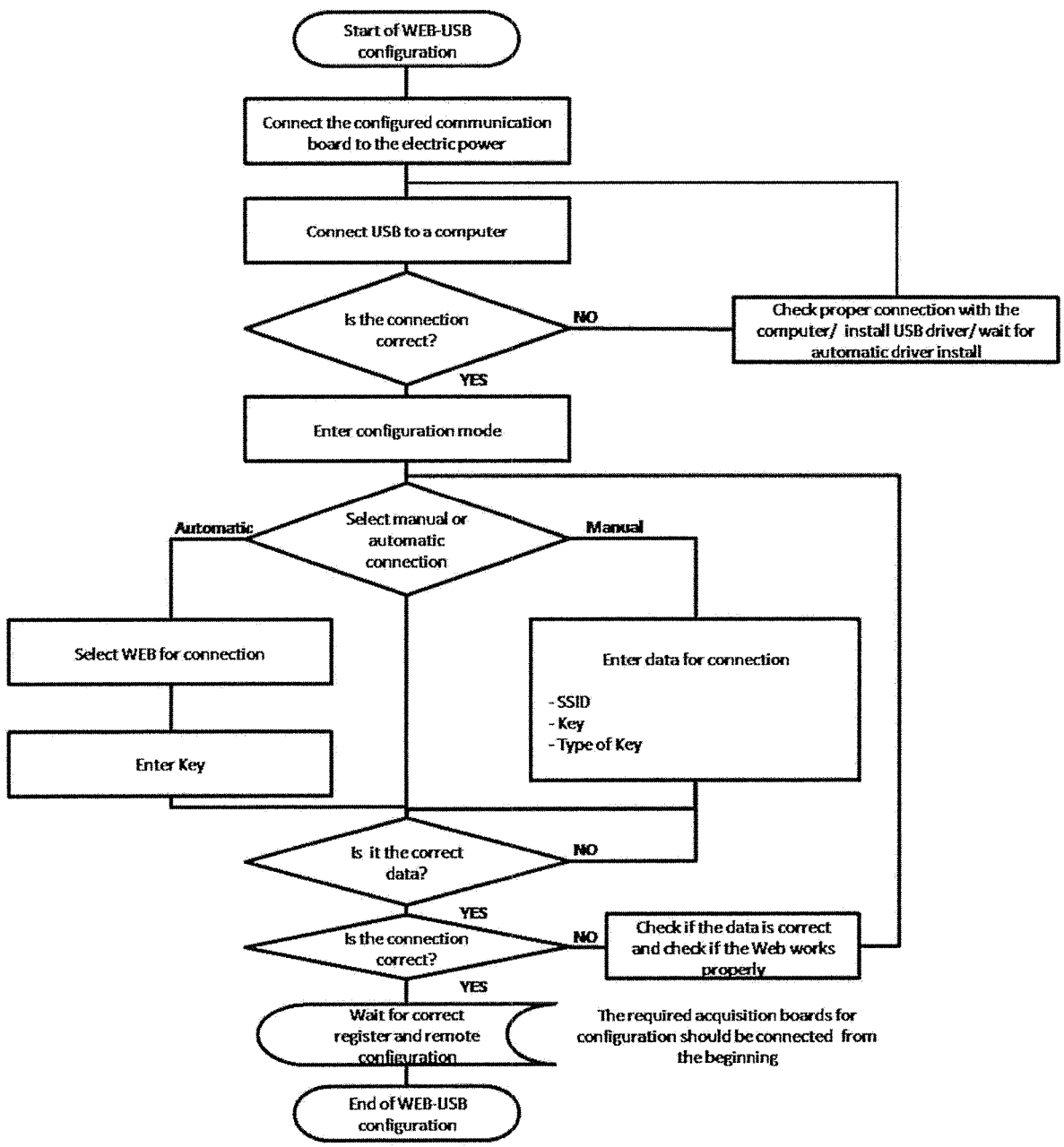
FIG. 9 shows a flow chart of the Network-USB Configuration process.

Similarly, the system for monitoring parameters of the present invention requires a Wi-Fi network configuration which allows the user to configure the acquisition boards (2), which must be connected to the communication board (1) at the time of configuration. The Wi-Fi Network configuration is illustrated in FIG. 9.

Figure 10:
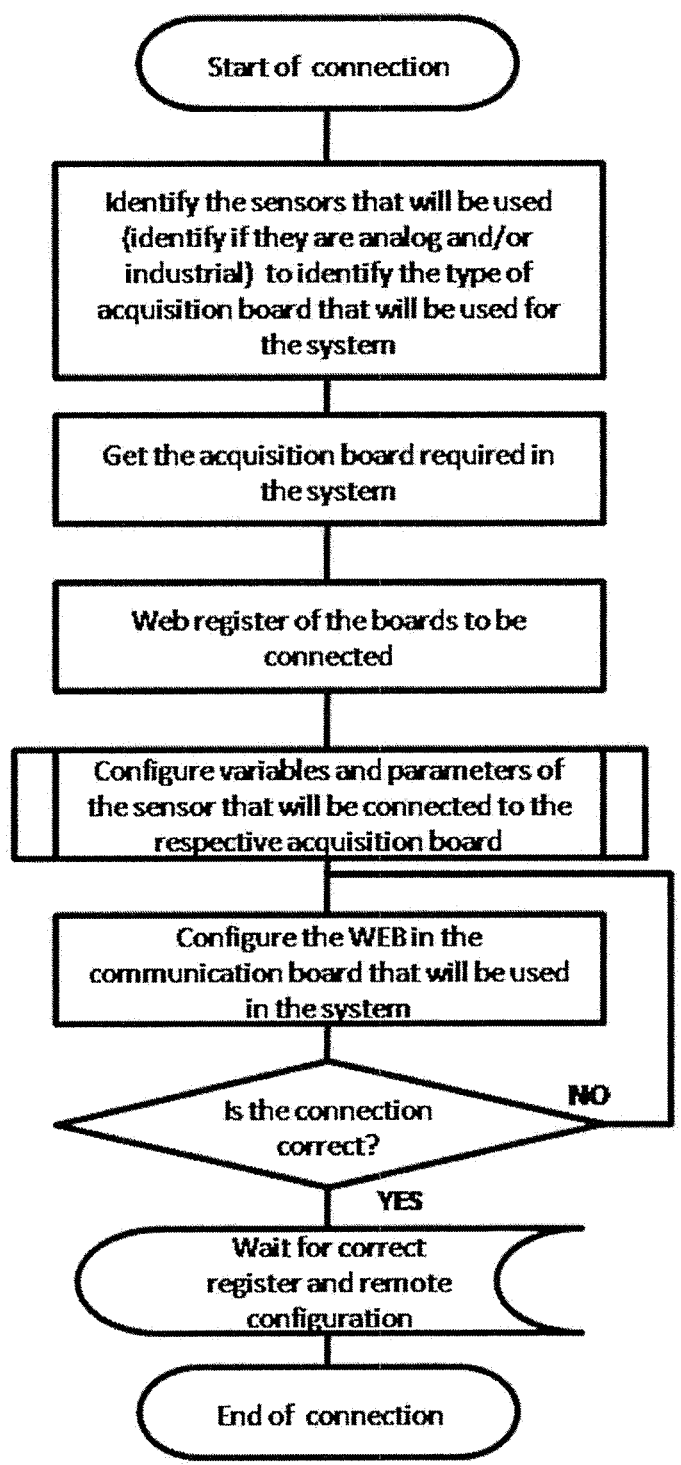
FIG. 10 shows a flow chart of the Sensor-Cloud Connection process.

The system for monitoring parameters of the present invention performs a connection process between the sensors connected to the acquisition board (2) and the cloud (9), so that the system can remotely read the value recorded by each one of the sensors. This process is illustrated in FIG. 10).

Figure 11:
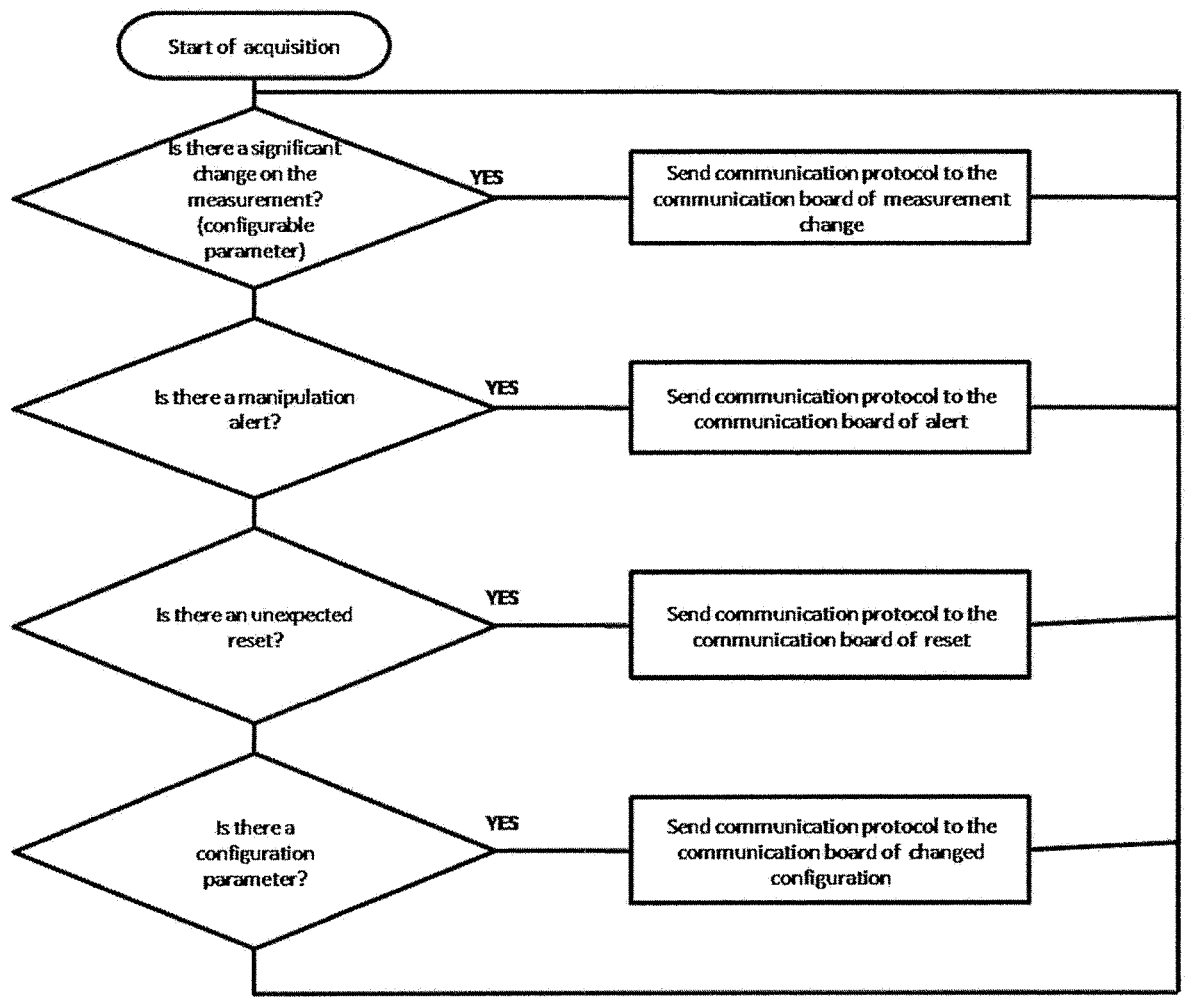
FIG. 11 shows a flow chart of the Acquisition board Data Acquisition process (2).

Regarding the operation process of the acquisition board (2), it is permanently communicated with the communication board (1), determining if there is any abrupt or significant change in the measurement of a sensor, any manipulation alert, a restart or unplanned reset, or a configuration parameter determined by the user. This process is explained in FIG. 11.

Figure 12:
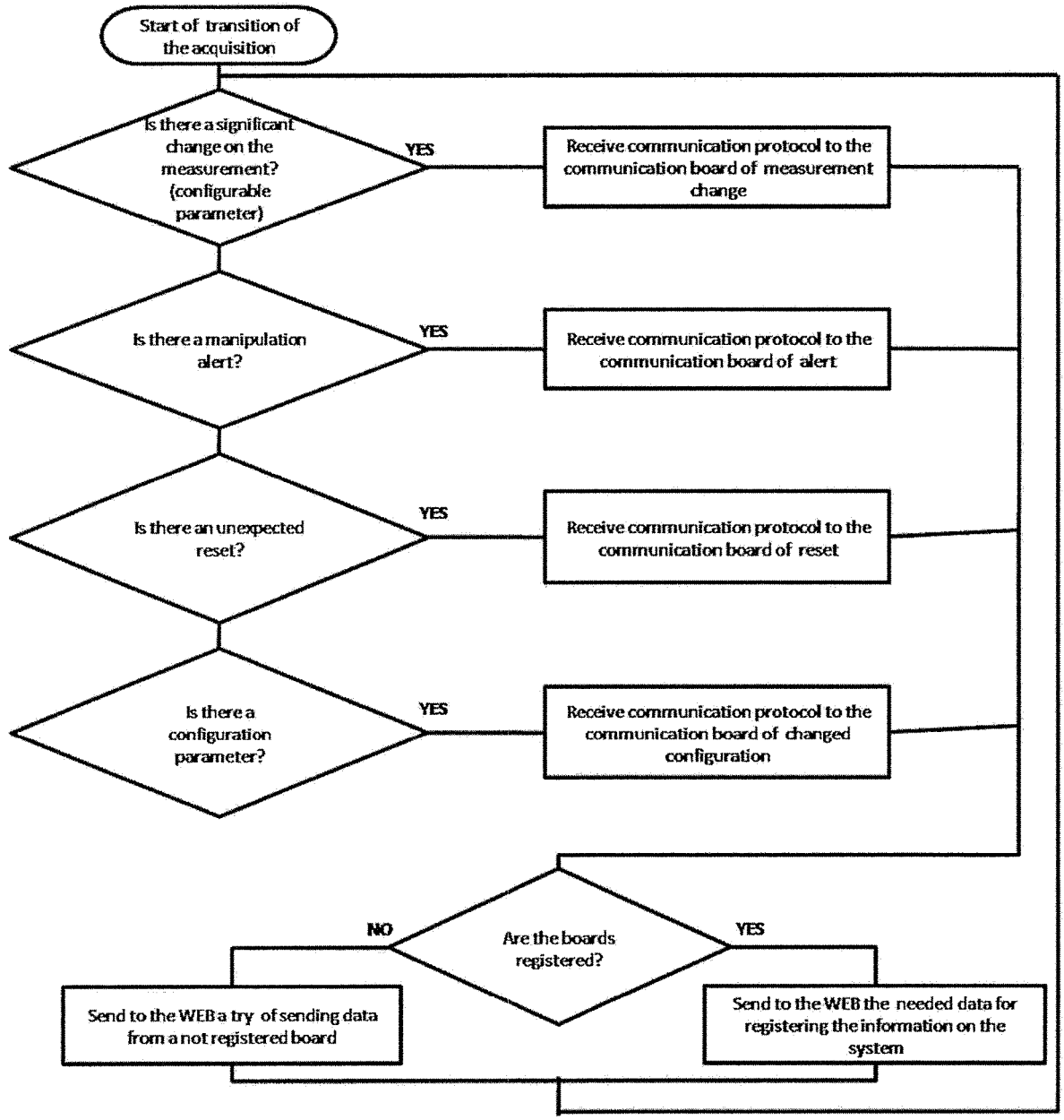
FIG. 12 shows a flow chart of the Data Acquisition process of the Communication board (1).

Regarding the process of acquiring data from the communication board (1) allows to receive the significant the measurement change in a sensor, some manipulation alert, a restart or unexpected reset, or a configuration parameter determined by the user. Likewise, it is determined if the acquisition boards (2) are registered in the website or not. This process is explained in FIG. 12.

Figure 13:
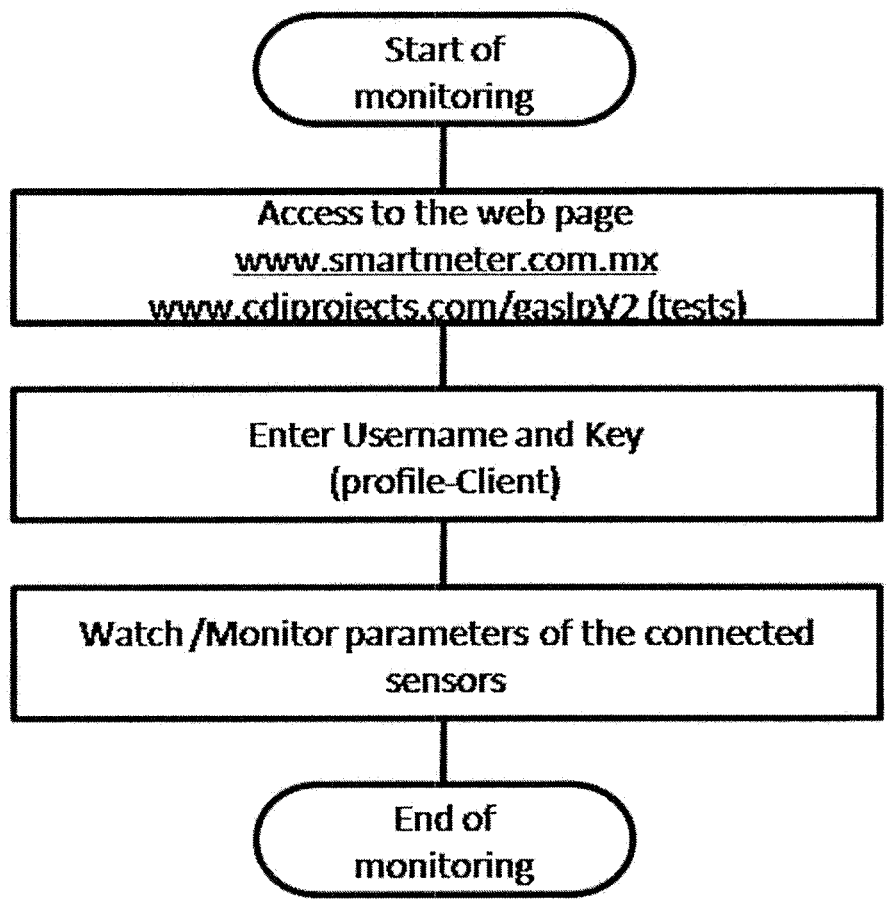
FIG. 13 shows a flow chart of the Web Site Monitoring process.

The user (8) can use the system for monitoring parameters of the present invention through a website. The access to it is made through the website by entering identification data, such as username and password to access the parameters measured by the sensors, using a computer (6) or a smartphone (7). This process is explained in FIG. 13.

Figure 14:
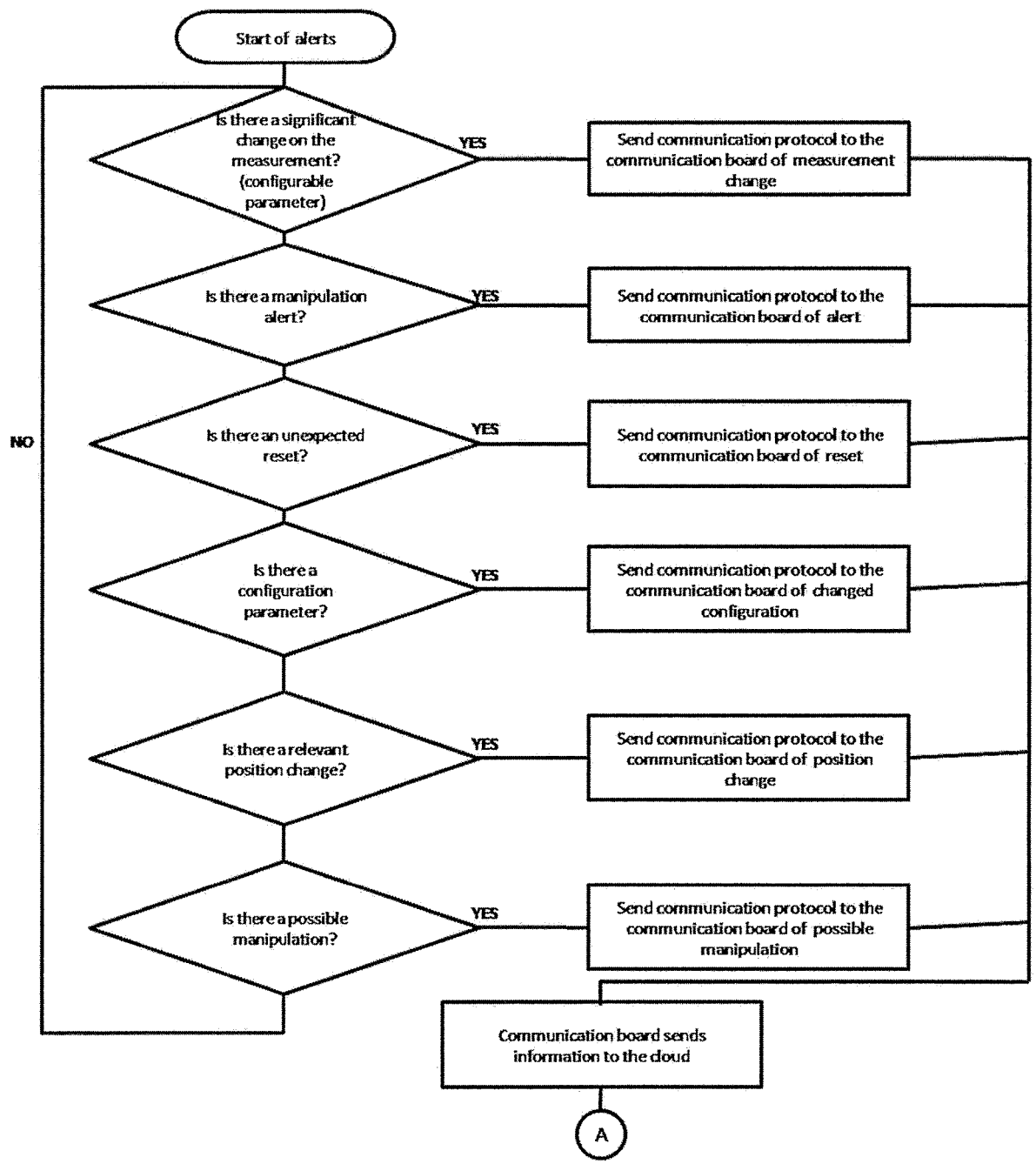
FIG. 14 shows the first part of the flow chart of the sending alerts through the website process.
Figure 15:
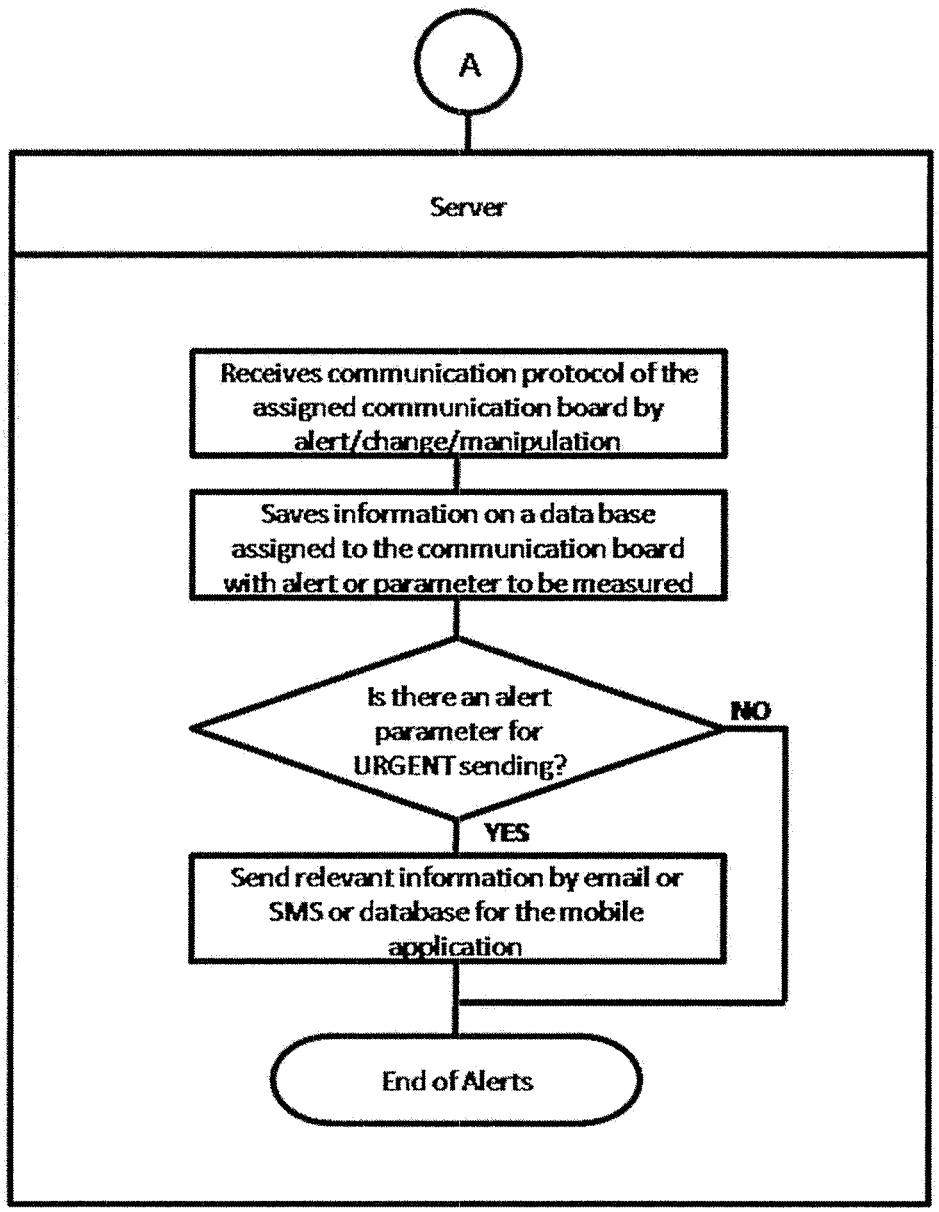
FIG. 15 shows the second part of the flow chart of FIG. 14 of the sending alerts through the website process.

On the other hand, FIGS. 14 and 15 show the process for sending alerts to the user through the website.

This process allows the communication board (1) to detect if there is any abrupt or significant measurement change, as well as any opening of the housing (manipulation alert) of the acquisition board (2), a reset or unforeseen resetting, a relevant change of the location of the communication board (1) by means of an optional GPS module integrated in the communication board (2), among other functions. Then it sends this information to the cloud (9) where the cloud server (9) receives the communications protocol of the communication board (1), where it stores the information in an assigned database.

The process for sending alerts also allows to determine if the alert is urgent, and if necessary, an alert is sent to the user (8) by email, SMS, or through a mobile application to his smartphone (7).

Below is shown an example to explain the operating characteristics of the present invention:

Example 1

FIG. 1 shows the operation of the system and device for monitoring parameters in one embodiment of the invention, with a stationary LP gas tank (4) located on the roof of a building.

The acquisition board (2) is fixed with screws to the manometer of the stationary LP gas tank (4) by its plastic housing.

The information gathered by the acquisition board (2), which is a specific acquisition board (2') for this embodiment of the invention, is subsequently sent to the communication board (1) by means of the connection cable (3).

In the communication board (1), the information coming from the acquisition board (2) is analyzed, processed and stored. Said analysis and processing is possible by the programmed algorithm recorded on the storage unit (107), which is executed by the microcontroller of the processing module (106).

Through the analysis, processing and storage of said information, it is possible to perform different functions such as alerts generation, communication with the user (8) by his smartphone (7), and communication with the user (8) by Internet due to the connection between the communication board (1), the modem (5), the cloud (9) and the computer (6).

The invention claimed is:

1. A device for monitoring parameters comprising
a communication board (1), which consists of a Wi-Fi module (101), a GPS and communication module RS-485 (102), a USB input (103), communication connectors (104), a transceiver (105), processing module (106), at least one storage unit (107), and a voltage regulator (108);
characterized in that it is connected with at least one acquisition board (2);
wherein said at least one acquisition board (2) is
a specific acquisition board (2'), which consist of an analog input (201), a data acquisition processing module (202), a transceiver (203) and a communications connector (204); and/or
a basic acquisition board (2") which consist of four analog inputs (201), and a 16-bit digital analog converter of 4 channels (205); a data acquisition processing module (202), a transceiver (203) and communication connectors (204); and/or
an industrial acquisition board (2''') which consist of four current inputs of 4-20 mA (206), a 4-20 mA to Voltage converter (207), a four channel digital analog converter of 16 bits (208), a data acquisition processing module (202), a transceiver (203) and communication connectors (204);
said at least one acquisition board (2) is characterized in that it comprises a manipulation detection device (209), which consist of two metal surfaces in contact through which flows a current that is permanently monitored by a microcontroller of a data acquisition processing module (202) of the at least one acquisition board (2).

2. The device for monitoring parameters according to claim 1, wherein the connection between the communication board (1) and acquisition board(s) (2) is by means of a connection cable (3).

3. The device for monitoring parameters according to claim 2, wherein said connection cable (3) is a cable with Ethernet connector CAT5/CAT5e preferably.

4. The device for monitoring parameters according to claim 1, wherein said acquisition board (2) has a plastic housing for fixing it to a manometer of the stationary tank (4).

5. The device for monitoring parameters according to claim 4, wherein said acquisition board (2) is mechanically connected to an axis of a manometer (4') of the stationary tank (4) by means of a rotary sensor.

6. The device for monitoring parameters according to claim 5, wherein said acquisition board (2) also has the ability to operate with a wide variety of sensors, such as pressure sensors, humidity, magnetic, temperature, among others.

7. The device for monitoring parameters according to claim 6, wherein said acquisition board (2) has 3 pins JST/HEADER type on each inputs (201 or 206).

8. The device for monitoring parameters according to claim 1, wherein said acquisition board (2), allows the communication of values from the sensor to the communication board (1) through the connection cable (3), by means of an RS-485 protocol to the communication board (1).

9. The device for monitoring parameters according to claim 1, wherein said information coming from the acquisition board(s) (2), is processed by a microprocessor of a processing module (106), and stored by the storage unit (107).

10. The device for monitoring parameters according to claim 9, wherein the processing module (106) consist of at least one microcontroller, meanwhile the storage unit (107) consist of at least one EEPROM memory.

11. The device for monitoring parameters according to claim 1, wherein the communication board (1) is connected to the internet by means of a Wi-Fi module (101).

12. The device for monitoring parameters according to claim 1, wherein the communication board (1) and the acquisition board(s) (2) have an optional backup battery.

13. The device for monitoring parameters according to claim 1, wherein the resolution of the specific acquisition board (2') is 10 bits, which allows to connect an analog input (201).

14. The device for monitoring parameters according to claim 1, wherein the resolution of the basic acquisition board (2") is 16 bits, which allows to connect four analog inputs (201).

15. The device for monitoring parameters according to claim 1, wherein the resolution of the industrial acquisition board (2'''), is 16 bits, which allows to connect four inputs 4-20 mA (206).

16. The device for monitoring parameters according to claim 1, wherein the voltage regulator (108) for the operation of the processing module (106), is an industrial regulator with an input range of 24 v to 5.5 V and output voltage of 5 v @ 1 A.

17. The device for monitoring parameters according to claim 1, wherein the USB input (103) is an integrated circuit responsible for the conversion of USB communication to UART communication.

18. The device for monitoring parameters according to claim 1, wherein the processing module (106), is an integrated circuit responsible for information processing and decision making of Wi-Fi communication and UART communication, which is responsible for processing the information that is sent to the internet of all the connected sensors in the same network.

19. The device for monitoring parameters according to claim 1, wherein the storage unit (107), consists of three external EEPROM memories, which are integrated circuits that store relevant information for the proper operation of the system, programs, algorithms and parameters, among others.

20. The device for monitoring parameters according to claim 1, wherein the Wi-Fi module (101), performs the UART communication with the processing module (106) for sending the data or information to the internet/to the cloud.

21. The device for monitoring parameters according to claim 1, wherein the GPS module and RS485 communication, are an integrated circuit responsible for information processing and decision making of RS485 communication and communication with the external GPS module.

22. The device for monitoring parameters according to claim 1, wherein the transceiver (105) for RS485 protocol of high speed and low power, is an integrated circuit responsible for performing the conversion of the UART communication to RS485 communication to transmit the necessary information throughout the network.

23. The device for monitoring parameters according to claim 1, wherein the communication connectors (104), are the means to perform the interconnection between the boards (1 and 2) with RJ-45 connectors.

24. The device for monitoring parameters according to claim 1, wherein the data acquisition processing module (202), is an integrated circuit responsible for the processing of information received from the analog input (201) which is sent to the transceiver (203) RS485.

25. The device for monitoring parameters according to claim 1, wherein the transceiver (203) for RS485 protocol of high speed and low power, is an integrated circuit responsible for performing the conversion of the UART communication to RS485 communication to transmit the necessary information throughout the network.

26. The device for monitoring parameters according to claim 1, wherein the communication connectors (204), are means to perform the interconnection between boards (1 and 2) with RJ-45 connectors.

27. The device for monitoring parameters according to claim 1, wherein the 4-channel 16-bit digital analog converter (205) is an integrated circuit responsible for the acquisition of data from analog inputs and digital conversion of 16 bits to be sent to the data acquisition processing module (202).

28. The device for monitoring parameters according to claim 1, wherein the 4-20 mA to Voltage converter (207), is an integrated circuit responsible for the acquisition of data inputs 4-20 mA (206) and conversion of current to voltage in order to be read in the digital analog converter (208) of the processing module.

29. The device for monitoring parameters according to claim 1, wherein the digital analog converter (208) of 16 bits of 4 channels, is an integrated circuit responsible for data acquisition of the 4-20 mA to Voltage converter (207) and digital conversion of 16 bits to be send to the data acquisition processing module (202).

30. A system for monitoring parameters comprising the device for monitoring the parameters of claim 1, wherein the Wi-Fi module (101) of the communication board (1), is connected to the Internet by a modem (5) to a remote server or cloud (9), which stores all the information that the acquisition board (2) sends to the communication board (1), characterized in that a user (8) can obtain said information by means of a computer (6), or any other device with an internet connection, such as a smartphone (7).

31. The system for monitoring parameters according to claim 30, wherein the processing module (106) of the acquisition board(s) (2), uses a registered configuration in a cloud (9) to store the information in the storage unit (107), and thus be able to analyze the information coming from the acquisition board(s) (2), and also be able to perform various actions such as
  connecting to the internet through the communication board (1);
  monitoring in real time physical parameters of the sensors connected to the acquisition board (s) (2); and
  controlling the calibration of said sensors.

32. The system for monitoring parameters according to claim 30, wherein the analysis of information performed by the processing module (106), is carried out during constant and automatic monitoring of the values obtained by the acquisition board(s) (2), since these values are introduced in an algorithm to detect abrupt fluctuations which generates a fluctuation alert.

33. The system for monitoring parameters according to claim 32, wherein said algorithm, as well as any other configuration relating to software, is programmed by a technician through a USB input (103) or through the registered configuration in the cloud (9).

34. The system for monitoring parameters according to claim 30, wherein a software contained in the storage unit (107), in conjunction with the processing module (106), allow receiving a manipulation alert from a sensor of the acquisition board(s) (2).

35. The system for monitoring parameters according to claim 30, wherein the connection by a modem (5) of the communication board (1) with a remote server or cloud (9), allows the user (8) to download the information that the acquisition board (2) sends to the communication board (1) in an electronic spreadsheet by means of a specialized software for this purpose.

36. The system for monitoring parameters according to claim 30, wherein a magnitude measured by a sensor of the acquisition board (2), is transmitted to the communication board (1), which in turn provides said measurement to the user (8) by means of a smartphone (7) or a computer (6) with internet connection, allowing said user (8) to be in a different location from the place where the measurement is made.

37. The system for monitoring parameters according to claim 30, wherein the user (8) can receive a manipulation alert when there is a power interruption between the metal surfaces of the manipulation detection device (209), since the alert generated in the acquisition board(s) (2), is transmitted to the communication board (1), which in turn transmits it to the user (8) by means of a smartphone (7) or a computer (6) with internet access.

38. The system for monitoring parameters according to claim 30, wherein the user (8) can receive an alert when an algorithm of the communication board (1) detects an abrupt change in the measurements of a sensor of the acquisition board(s) (2), generating an alert on the communication board (1), which in turn transmits it to the user (8) by means of a smartphone (7) or a computer (6) with Internet access.

39. The system for monitoring parameters according to claim 30, wherein the communication of the device for monitoring parameters with the user (8) can be done through the Internet due to a connection between the Wi-Fi module (101) of the communication board (1), the modem (5), the cloud (9), and finally the computer (6) or the smartphone (7) with Internet connection of the user (8), wherein all the connections mentioned above have bidirectional communication.

40. The system for monitoring parameters according to claim 30, wherein the system and device for monitoring parameters provide necessary reference information to detect fraud during a supply, since an electronic record that can be downloaded from the cloud (9) or the query that can be done through the computer (6) or the smartphone (7), can be compared with an amount of reference information that a provider reported to have supplied.

41. The system for monitoring parameters according to claim 30, characterized in that it requires a registration in a website of the system, which will allow the user (8) to consult the information stored in the cloud (9), by means of a computer (6) and/or a smartphone (7).

42. The system for monitoring parameters according to claim 30, characterized in that it requires a Wi-Fi network configuration which allows the user to configure the acquisition boards (2), which must be connected to the communication board (1) at the time of configuration.

43. The system for monitoring parameters according to claim 30, characterized in that it makes a connection process between sensors connected to the acquisition board (2) and the cloud (9), so that the system can perform a reading of the value recorded by each of the sensors remotely.

44. The system for monitoring parameters according to claim 30, characterized in that the acquisition board (2) communicates permanently with the communication board (1), determining if there is any abrupt or significant change in a measurement of a sensor, some manipulation alert, a restart or unexpected reset, or a configuration parameter determined by the user.

45. The system for monitoring parameters according to claim 30, characterized in that a process of acquiring data from the communication board (1), allows receiving a significant change in a measurement of a sensor, some manipulation alert, a restart or unexpected reset, or a configuration parameter determined by the user, likewise, it is determined if the acquisition boards (2) are registered in a website or not.

46. The system for monitoring parameters according to claim 30, characterized in that access to a website is made by entering identification data, such as username and password in order to have access to the parameters measured by the sensors, using a computer (6) or a smartphone (7).

47. The system for monitoring parameters according to claim 30, characterized in that a process for sending alerts to the user through a website allows the communication board (1) to detect if there is any abrupt or significant change in a measurement, some opening of a housing or the acquisition board (2), unexpected restarts or resets, a significant change of the communication board (1) location of by means of an optional GPS module integrated in the communication board (1).

48. The system for monitoring parameters according to claim 47, wherein the cloud server (9) receives a communication protocol of the communication board (1), where it stores the information in an assigned database.

49. The system for monitoring parameters according to claim 47, wherein a process for sending alerts also allows to determine if the alert is of an urgent nature, and in its case, an alert is sent to the user (8) by means of email, SMS, or via a mobile application to a smartphone (7).

\* \* \* \* \*